(12) United States Patent
Callahan

(10) Patent No.: US 11,994,063 B2
(45) Date of Patent: May 28, 2024

(54) TURBINE POWERED ELECTRICITY GENERATION

(71) Applicant: Richard Alan Callahan, Isle La Motte, VT (US)

(72) Inventor: Richard Alan Callahan, Isle La Motte, VT (US)

( * ) Notice: Subject to any disclaimer, the term of this patent is extended or adjusted under 35 U.S.C. 154(b) by 628 days.

(21) Appl. No.: 16/654,436

(22) Filed: Oct. 16, 2019

(65) Prior Publication Data

US 2021/0115848 A1 Apr. 22, 2021

(51) Int. Cl.
| | |
|---|---|
| *F02C 3/34* | (2006.01) |
| *B01D 53/047* | (2006.01) |
| *B01D 53/22* | (2006.01) |
| *F02C 3/22* | (2006.01) |
| *F02C 3/24* | (2006.01) |
| *F02C 3/30* | (2006.01) |

(52) U.S. Cl.
CPC .............. *F02C 3/34* (2013.01); *B01D 53/047* (2013.01); *B01D 53/22* (2013.01); *F02C 3/22* (2013.01); *F02C 3/24* (2013.01); *F02C 3/30* (2013.01); *Y02E 20/16* (2013.01)

(58) Field of Classification Search
CPC ...... F02C 3/34; F02C 3/24; F02C 3/30; F02C 6/18; B01D 53/047; B01D 53/22
See application file for complete search history.

(56) References Cited

U.S. PATENT DOCUMENTS

| | | | |
|---|---|---|---|
| 2,548,377 A | 4/1951 | Kapitza | |
| 4,083,945 A | 4/1978 | Fenton et al. | |
| 4,085,199 A | 4/1978 | Singleton et al. | |
| 4,094,746 A | 6/1978 | Masciantonio et al. | |
| 4,345,925 A | 8/1982 | Cheung | |
| 4,382,366 A | 5/1983 | Gaumer | |
| 4,531,371 A | 7/1985 | Voronin et al. | |
| 4,533,375 A | 8/1985 | Erickson | |
| 4,836,833 A | 6/1989 | Nicholas et al. | |
| 5,700,438 A | 12/1997 | Miller | |
| 6,221,131 B1* | 4/2001 | Behling | B01D 53/226 95/50 |
| 6,389,814 B2 | 5/2002 | Viteri et al. | |
| 6,877,319 B2* | 4/2005 | Linder | B01D 53/229 60/39.181 |
| 6,997,971 B1 | 2/2006 | Young et al. | |
| 7,827,794 B1 | 11/2010 | Pronske et al. | |
| 7,950,529 B2 | 5/2011 | Kulkarni et al. | |
| 8,420,211 B2 | 4/2013 | Ohya et al. | |

(Continued)

FOREIGN PATENT DOCUMENTS

| | | |
|---|---|---|
| CN | 1713949 A | 12/2005 |
| CN | 102946981 A | 2/2013 |

(Continued)

OTHER PUBLICATIONS

E-Combustion Capture, CATF (Clean Air Task Force) article, 2019.

(Continued)

*Primary Examiner* — Stephanie Sebasco Cheng

(57) ABSTRACT

A process is provided for separating syngas fuel into a CO-rich stream for feeding to an oxyfuel combustor of a CO2 turbine and a H2-rich stream for feeding to an air-fuel gas turbine for generating power, which provides an opportunity to realize operating and equipment advantages.

11 Claims, 8 Drawing Sheets

(56) References Cited

U.S. PATENT DOCUMENTS

| | | | |
|---|---|---|---|
| 8,541,517 | B2 | 9/2013 | Klaehn et al. |
| 8,596,075 | B2 | 12/2013 | Allam et al. |
| 8,715,379 | B2 | 5/2014 | Briesch et al. |
| 8,753,426 | B2 | 6/2014 | Zheng et al. |
| 8,959,887 | B2 | 2/2015 | Allam et al. |
| 9,062,608 | B2 | 6/2015 | Allam et al. |
| 9,321,015 | B2 | 4/2016 | Jayaweera et al. |
| 9,776,863 | B2 | 10/2017 | Iaquaniello et al. |
| 9,782,718 | B1 | 10/2017 | Baker et al. |
| 9,812,723 | B2 | 11/2017 | Ghezel-Ayagh |
| 9,869,245 | B2 | 1/2018 | Allam et al. |
| 9,932,229 | B2 | 4/2018 | Iaquaniello et al. |
| 10,047,671 | B2 | 8/2018 | Allam et al. |
| 10,144,874 | B2 | 12/2018 | Walter et al. |
| 11,808,206 | B2 * | 11/2023 | Callahan ............ F02C 3/28 |
| 2002/0035924 | A1 * | 3/2002 | Keefer ............ B01D 53/047 95/113 |
| 2004/0170557 | A1 * | 9/2004 | Asen ............ B01J 8/009 423/652 |
| 2012/0058921 | A1 * | 3/2012 | Van Den Berg ... B01D 53/1462 507/202 |
| 2012/0195824 | A1 | 8/2012 | Van De Graaf et al. |
| 2013/0106110 | A1 * | 5/2013 | Marley, II ............ F01K 3/02 290/52 |
| 2014/0250908 | A1 * | 9/2014 | Huntington ............ F02C 3/20 60/776 |
| 2014/0251897 | A1 | 9/2014 | Livingston et al. |
| 2016/0375410 | A1 | 12/2016 | Berchtold et al. |
| 2017/0081477 | A1 | 3/2017 | McGrath et al. |
| 2018/0304193 | A1 | 10/2018 | Al-Maythalony et al. |

FOREIGN PATENT DOCUMENTS

| | | |
|---|---|---|
| CN | 205779064 U | 12/2016 |
| DE | 3855952 T2 | 2/1998 |
| JP | 01194925 A | 8/1989 |
| JP | 2003106164 A | 4/2003 |
| JP | 2007254270 A | 10/2007 |
| JP | 5242207 B2 | 7/2013 |
| JP | 2016522836 A | 8/2016 |
| WO | WO 2007/092084 A2 | 8/2007 |
| WO | WO2018030356 A1 | 2/2011 |
| WO | WO2012045335 A1 | 4/2012 |
| WO | WO2018043053 A1 | 3/2018 |

OTHER PUBLICATIONS

Air Products CRIEPI 1988 Test Facility, Figure 7.5 from Robert E. Kesting and A. K. Fritzsche, Polymeric Gas Separation Membranes, JohnWiley & Sons, Inc. (Dec. 1993).

Giovanni Lozza et al., "C02 Capture from Natural Gas Combined Cycles", Article from ResearchGate, Jan. 2009.

Ube C02 Separation Membranehttp, product bulletin obtained from ://www.ube.co.th/picture/file/C02%20Separation%20Membrane.pdf.

A. Zogala,Equilibrium Simulations of Coal Gasification—Factors Affecting Syngas Composition, Journal of Sustainable Mining, 2014, e-ISSN 2300-3960 | p-ISSN 2300-1364.

Indira S. Jayaweera, Development of Pre-Combustion C02Capture Process Using High-Temperature Polybenzimidazole (PBI) Hollow-Fiber Membranes (HFMs), Aug. 2017.

Sonai Patel, Game-Changing supercritical C02 Cycles are closer to Commercialization, Dec. 13, 2017, ConnectedPiant Conference, https://www.powermag.com/a.

Xijia Lu et al., Investigation of Low Rank Coal Gasification in aTwo-Stage Downdraft Entrained-Flow Gasifier, International Journal of Clean Coal and Energy, 2014, 3, 1-12.

S. Wong, C02 capture: Pre-combustion and oxy-fuel technologies, Original text: S. Wong, APEC Capacity Building in the APEC Region, Phase II Revised and updated by C02CRC.

F. Kasuya et al., Article in Gas Separation & Purification 5(4):242-246—Dec. 1991 with 295 Reads DOI: 10.1 016/0950-4214 (91)80031-Y.

J.-M. Amann et ai., Reforming Natural Gas for C02 pre-combustion capture in Combined Cycle power plantArticle, Clean Technologies and Environmental Policy 11 (1 )67-76,Feb. 2009.

Syngas Composition,https://www.netl.doe.gov/research/coal/energy-systems/gasification/gasifipedia/syngascomposition.

Clarke Energy Syngas Newsletter, https://www .clark-energy .com/synthesis-gas-syngas.

David Wagman, This Power Plant Runs on C02, Article, https://www.enggtalks.com/news/79876/this-power-plant-runs-on-co2, May 2018.

Ube Technical Bulletin, Ube Gas Separation System, by Polyimide Membrane, 1989.

Nikolic and Kikkinides, Modelling and optimization of hybrid PSA/membrane separation processes, Apr. 9, 2015.

IGCC With Low Temperature Membrane (LTM) Carbon Capture, Dislosure to Air Products, Oct. 24, 2006, by Enerfex, Inc.

* cited by examiner

TURBINE POWERED ELECTRICITY GENERATION

The present invention relates to turbine-powered electricity supply.

BACKGROUND OF THE INVENTION

All patents, patent applications and other publications referred to herein are specifically incorporated herein by reference in their entirety.

Among its many known uses, synthesis gas (syngas) can be used as the fuel in gas turbine driven power plants. Synthesis gas (syngas) is a gas mixture comprising primarily hydrogen ($H_2$), carbon monoxide (CO), water ($H_2O$) and carbon dioxide ($CO_2$), with minor amounts of other compounds (e.g., nitrogen, argon, hydrogen sulfide and methane). It can be produced by a number of known methods, including but not limited to coal gasification, steam methane reforming (SMR) and autothermal reforming (ATR).

In a gas turbine syngas is fed as a fuel together with air. There are three main turbine components:
1. An upstream axial rotating gas compressor section;
2. A downstream turbine expansion section on a common shaft with the compressor;
3. A combustion chamber or area, called a combustor, in between 1. and 2. above.

Atmospheric air flows through the compressor that brings it to higher pressure. Fuel is mixed with the air in a combustor wherein it is ignited to produce high temperature working fluid. In the case of syngas as fuel, energy is added by spraying syngas into the air and igniting it. This high-temperature high-pressure working fluid enters a turbine where it expands down to an exhaust pressure, producing shaft work output in the process. The turbine shaft work is used to drive the compressor; the energy that is not used to drive the compressor exits in the exhaust gases to produce thrust (power). The purpose of the gas turbine determines the design so that the most desirable split of energy between the thrust and the shaft work is achieved.

In the steam reforming process, a mixture of water and hydrocarbon, typically natural gas, are contacted at a high temperature, for example, in the range of about 850° to about 900° C., and typically in the presence of a catalyst, to form a mixture of hydrogen and carbon monoxide. Using methane as the hydrocarbon, the theoretical stoichiometry for the steam reforming reaction is as follows:

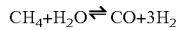

$$CH_4 + H_2O \rightleftharpoons CO + 3H_2$$

As illustrated in U.S. Pat. Nos. 9,782,718 and 3,965,675, a gas turbine can be combined with a steam turbine. In this "combined" system, hot exhaust from the gas turbine produces steam in a heat recovery steam generator for feeding as a working fluid to a steam turbine. In the combined system, each of the gas turbine and the steam turbine can be utilized to produce electricity.

Gas turbine power plants and combined gas turbine/steam turbine power plants known as combined cycle power plants (CC) can use the burning of fossil fuel to generate required heat. These systems have known drawbacks, for example harmful air emissions. Natural gas power plants (NGCC) produce large quantities of pollutants, especially carbon dioxide. Coal fired plants (IGCC) add sulfur oxides, mercury and fine particles. These drawbacks are typically addressed by adding expensive, energy-intensive equipment to reduce or clean up emissions after they are produced. However, the required systems degrade performance, reliability and increase the cost of electricity and the total cost of the power plant. They are expensive to build, complex and energy intensive.

For example, regarding IGCC coal-based plants, see "Commercial Power Production based on Gasification\netl . . . ", https://www.netl.doe.gov>energy-systems>gasification>gasifipedia>igcc, [Retrieved Sep. 22, 2019], National Energy Technology Laboratory (NETL), wherein it states, "Some important challenges to the wide-spread adoption of IGCC technology include cost, availability, and complexity. Cost is widely cited as the greatest barrier to IGCC acceptance. Capital costs for IGCC are high compared with alternative power plant designs, particularly NGCC, and financial viability is often dependent upon subsidies or tax credits. As a relatively new technology relative to PC and NGCC, development and design costs are much higher for IGCC. Availability also impacts operating costs and must be high enough to compete favorably with the conventional alternatives. The complexity of IGCC relative to older, more established plant designs also increases operating costs and can impact availability and the generation of capital for plant development. These challenges to gasification, with a focus towards IGCC, are discussed in the introductory discussion about gasification." See also, "The Three Factors That Doomed Kemper County IGCC", spectrum.ieee.org/energywise/energy/fossil-fuels/ . . . , Jun. 30, 2017, IEEE Spectrum, [Retrieved Sep. 22, 2019.

In light of the noted problems related to IGCC power plants, and with the advent of relatively cheap natural gas, power plant companies are turning to NGCC power plants. Since natural gas (NG) became readily available as fuel for gas turbines, it was fed directly to the combustion chamber. A non-limiting illustrative example of an NGCC power plant is schematically shown in FIG. 1.

With reference to FIG. 1, reference numeral 1 generally refers to a gas turbine generator for producing power. Gas turbine 1 comprises compression section 3, expansion section 2 and combustor section 4 shown therebetween. Air stream 6 is fed to compression section 3. Natural gas stream 5 is fed to combustor section 4 wherein it is combusted with compressed air stream 7 to produce gas turbine working fluid 8. Gas turbine working fluid 8 flows to expansion section 2 wherein the expanding working fluid produces power for operating compressor section 3 and an electricity generator 9. Gas turbine exhaust 10 flows to heat exchanger 11 wherein exhaust stream 10 is cooled by indirect heat exchange with circulating water stream 13. Cooled exhaust stream 10 is vented to the atmosphere in vent stream 12. Circulating water stream 13 is heated to produce steam stream 14. Steam stream 14 then flows to a steam turbine 15 that produces power to operate electricity generator 16. After expansion in steam turbine 15, stream 17 flows to condenser 18 wherein stream 17 is condensed to water. The water stream 17a exiting condenser 18 is then recycled to heat exchanger 11 by pump 19.

The present invention relates to a novel process for operating NGCC power plants. According to an embodiment, the process comprises:
  a. feeding a separator feedstream comprising syngas from natural gas to separator means,
  b. separating the separator feedstream in the separator means to form a first, CO-rich stream and a second, $H_2$-rich stream, c. feeding the first, CO-rich stream as an oxyfuel combustor feedstream to oxyfuel combustor means for forming sub-critical $CO_2$ gas turbine working fluid, and
d. feeding the sub-critical $CO_2$ gas turbine working fluid to gas turbine means for producing power.

In the context of the standard NGCC power plant systems that feed natural gas directly to the gas turbine combustor, converting the natural gas to syngas and further separating the syngas to a first, CO-rich stream and a second, $H_2$-rich stream was found to result in unexpected operating efficiencies and advantages as will become clear from this disclosure.

According to another embodiment, the process comprises:
a. feeding a separator feedstream comprising syngas from natural gas to separator means,
b. separating the separator feedstream in the separator means to form a first, CO-rich stream and a second, $H_2$-rich stream,
c. feeding the first, CO-rich stream as an oxyfuel combustor feedstream to oxyfuel combustor means for forming sub-critical $CO_2$ gas turbine working fluid,
d. feeding the sub-critical $CO_2$ gas turbine working fluid to sub-critical $CO_2$ gas turbine means, the sub-critical $CO_2$ gas turbine means having a sub-critical $CO_2$ gas turbine expansion section and a sub-critical $CO_2$ gas turbine compression section, the sub-critical $CO_2$ gas turbine working fluid being fed to the sub-critical $CO_2$ gas turbine expansion section for producing power,
e. recycling at least a first portion of exhaust from the sub-critical $CO_2$ gas turbine expansion section to the sub-critical $CO_2$ gas turbine compression section of the sub-critical $CO_2$ gas turbine means, wherein the power produced in step (d) is used to power the sub-critical $CO_2$ gas turbine compression section to compress the recycled sub-critical $CO_2$ gas turbine exhaust,
f. capturing the remaining portion of sub-critical $CO_2$ gas turbine exhaust,
g. feeding the compressed sub-critical $CO_2$ gas turbine exhaust to the oxyfuel combustor means,
h. reacting the first, CO-rich stream with high purity oxygen in the oxyfuel combustor means under sub-critical $CO_2$ conditions,
i. feeding the second, $H_2$-rich stream as an air-fuel combustor feedstream to air-fuel combustor means wherein the air-fuel combustor feedstream is reacted with air to form an air-fuel gas turbine working fluid,
j. feeding the air-fuel gas turbine working fluid to air-fuel gas turbine means, the air-fuel gas turbine means having an air-fuel gas turbine expansion section and an air-fuel gas turbine compression section, the air-fuel gas turbine working fluid being fed to the of air-fuel gas turbine expansion section for producing power,
k. feeding air to the air-fuel gas turbine compression section of the air-fuel gas turbine means, wherein the air is compressed using the power produced in step (j),
l. feeding the compressed air to the air-fuel combustor means for reaction with the second, $H_2$-rich stream to form the air-fuel gas turbine working fluid,
m. wherein before recycling exhaust from the sub-critical $CO_2$ gas turbine expander section to the sub-critical $CO_2$ gas turbine compression section of the sub-critical $CO_2$ gas turbine means, the exhaust is fed to first heat recovery steam generator means for generating steam,
n. wherein steam from the first heat recovery steam generator means is fed to first steam turbine means for generating power,
o. wherein exhaust from the air-fuel gas turbine means is fed to second heat recovery steam generator means for generating steam, and
p. wherein steam from the second heat recovery steam generator means is fed to second steam turbine means for generating power.

According to a further embodiment, the process comprises:
a. feeding a separator feedstream comprising syngas from natural gas to separator means,
b. separating the separator feedstream in the separator means to form a first, CO-rich stream and a second, $H_2$-rich stream,
c. feeding the first, CO-rich stream as an oxyfuel boiler feedstream to oxyfuel boiler means for generating steam, and
d. feeding the steam to first steam turbine means for generating power.

DETAILED DESCRIPTION OF THE INVENTION

Figure 1:
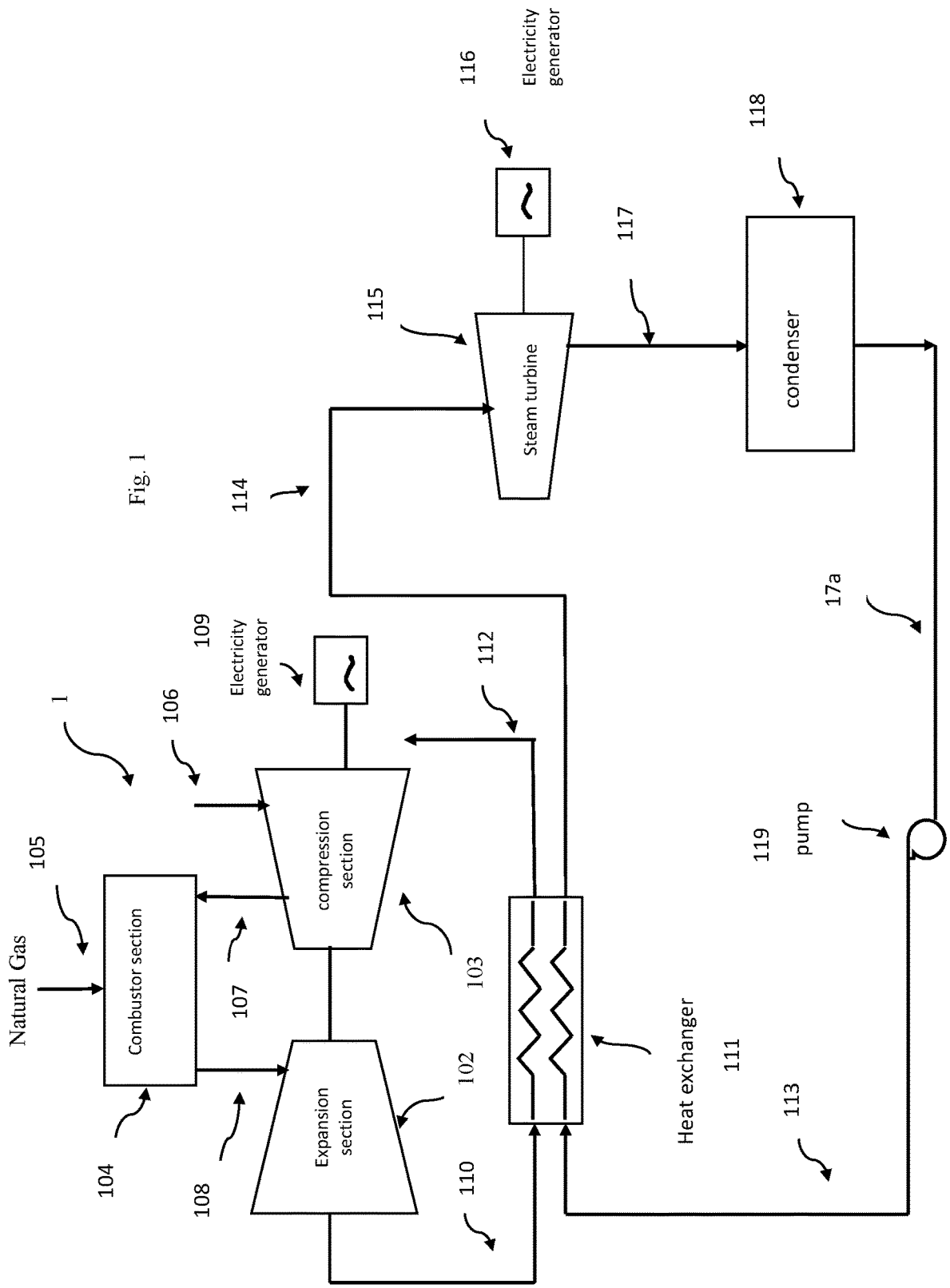
FIG. 1 is a schematic diagram of a conventional NGCC power plant.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

All publications, patents and patent applications cited herein, whether supra or infra, are hereby incorporated herein by reference in their entirety to the same extent as if each individual publication, patent or patent application was specifically and individually indicated to be incorporated herein by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, as well as, any range formed within a specified range, regardless of whether ranges are separately disclosed. Where a range of numerical values is recited herein, unless otherwise stated, the range is intended to include the endpoints thereof, and all integers and fractions within the range. For example, recitation of 1-5 is intended to include all integers including and between 1 and 5 and all fractions and decimals between 1 and 5, e.g., 1, 1.1, 1.2, 1.3 etc. It is not intended that the scope of the invention be limited to the specific values recited when defining a specific range. Similarly, recitation of at least about or up to about a number is intended to include that number and all integers, fractions and decimals greater than or up to that number as indicated. For example, at least 5 is intended to include 5 and all fractions and decimals above 5, e.g., 5.1, 5.2, 5.3 etc.

It is noted that, as used in this specification and the appended claims, the singular forms "a," "an" and "the" include plural referents unless the content clearly dictates otherwise. Unless otherwise expressly indicated herein, all amounts are based on volume.

Figure 2:
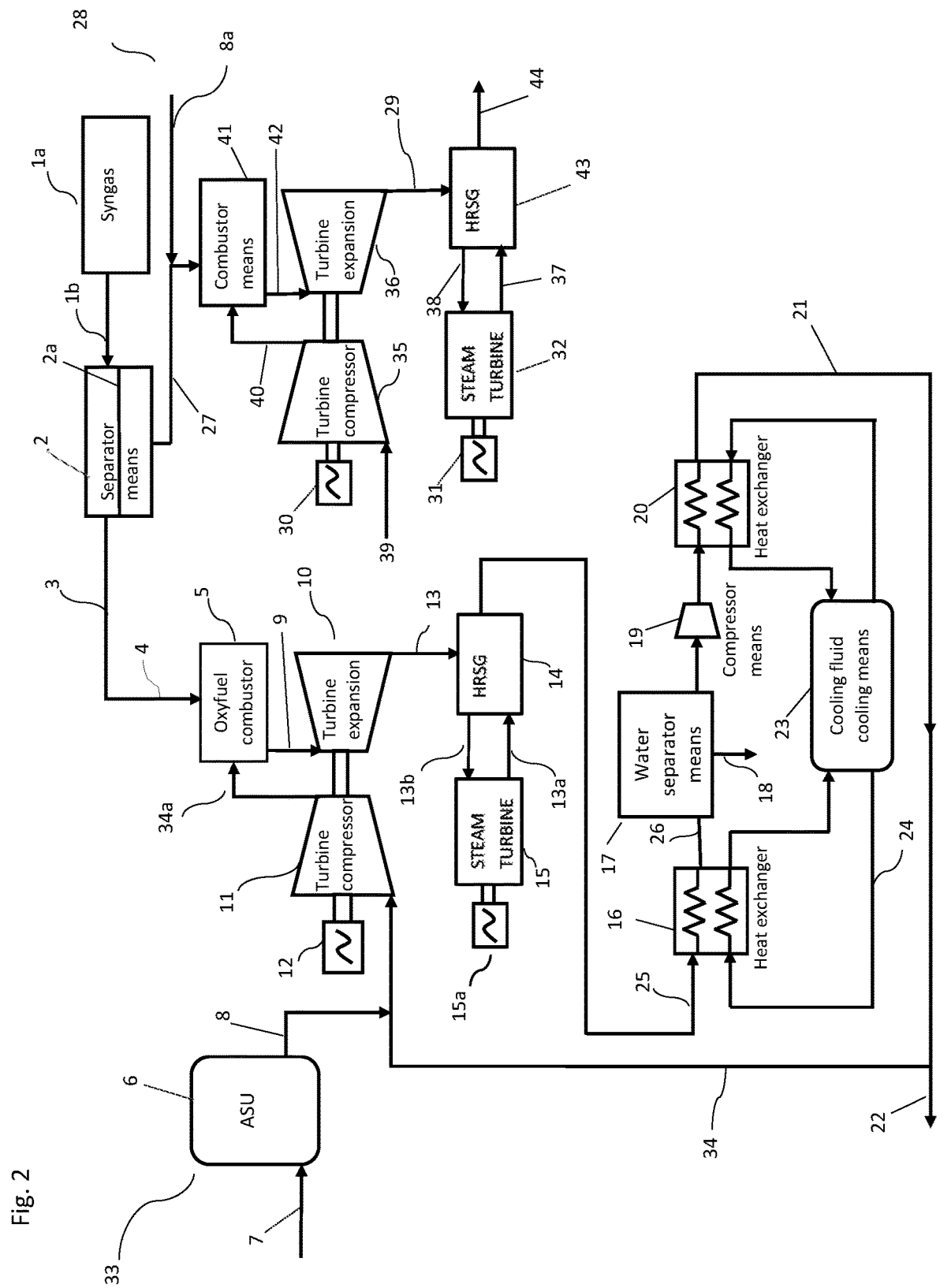
FIG. 2 is a schematic diagram of a NGCC power plant using separated syngas as fuel.

With reference to illustrative FIG. 2 of the drawings, 1a is a source for converting natural gas to syngas, for example, by steam methane reforming (SMR) or autothermal (reforming). See, for example, U.S. Pat. Nos. 3,479,298, 5,653,774, 6,340,437, 7,481,856, 4,415,484, 7,592,290 and 5,628,931. Steam reforming of natural gas can proceed in tubular reactors that are heated externally. The process uses nickel catalyst on a special support that is resistant against the harsh process conditions. Waste heat from the heating section is used to preheat gases and to produce steam. Partial oxidation of methane is a non-catalytic, large-scale process to make syngas. A catalytic version of partial oxidation (CPO), based on short-contact time conversion of methane, on e.g. rhodium catalysts, is suitable for small-scale applications. Autothermal reforming (ATR) is a hybrid, which combines methane steam reforming and oxidation in one process. The heat needed for reforming is generated inside the reactor by oxidation of the feed gas.

Syngas feed compositions are well known in the art and can vary depending on the source. By way of nonlimiting example, it is believed that syngas feed 1b can comprise $H_2$, $CO_2$, CO, $CH_4$ and $H_2O$ in the following amounts. The $H_2$ content can be about 20-65%. The $CO_2$ content can be about 2-25%. The CO content can be about 20-60%. The $H_2O$ content can be about 5-40%. The $CH_4$ content can typically be about 0.1%-0.9%. It is understood that the syngas feed 1b may contain minor amounts of contaminants, e.g., $H_2S$, $NH_3$, HCl, COS, and Hg, depending whether the syngas is gasified coal or reformed natural gas, and can be removed by known treatments. By way of example, contaminants could comprise less than about 0.5% of syngas feed 1b.

Separator means 2 can be any known separator means suitable for the purpose of separating the syngas feedstream into a first, CO-rich stream 3 and a second, $H_2$-rich stream 27. For example, separator means can be membrane separator means or pressure swing adsorption means. Membrane separation is preferred.

Gas separation membranes and the operation thereof for separating gas mixtures are well known. See for example, U.S. Pat. No. 5,482,539. U.S. Pat. Nos. 4,990,168, 4,639, 257, 2,966,235, 4,130,403, 4,264,338, and 5,102,432. Any known membrane that is operable under the conditions of operation to meet the noted product compositions can be used. For example, Ube membranes and Generon® membranes advertised for $H_2$ separations would be suitable, as would apolybenzimidazole (PBI) membrane. Reference is made, respectively, to Haruhiko Ohya et al, "Polyimide Membranes: Applications, Fabrications and Properties" by H. Ohya, V. V. Kudryavtsev and S. I, Semenova (Jan. 30, 1997) co-published by Kodansha LYD., 12-21 Otowa 2-Chome Bunkyo-Ku, Tokyo 112, Japan and Gordan and Breach Science Publishers S.A. Emmaplein 5, 1075 AW Amsterdam, The Netherlands, for the Ube membranes and to Jayaweera, Indira S. "Development of Pre-Combustion $CO_2$ Capture Process Using High-Temperature Polybenzimidazole (PBI) Hollow-Fiber Membranes (HFMs)", 2017 NETL $CO_2$ Capture Technology Project Review Meeting, Aug. 21-25, 2017, [online] [retrieved Jan. 17, 2019], [https://www.netl.doe.gov/sites/default/files/2017-12/2I-S-Jayaweera2-SRI-PBIHollow-Fiber-Membranes.pdf], and "Celazole® PBI", [online] [retrieved Jan. 17, 2019], [https://pbipolymer.com/markets/membrane/].

As illustrated in FIG. 2, separator means 2 comprises membrane means 2a disposed therewithin. The syngas feedstream is fed to separator means on one side of the membrane means and is separated into separate streams by selective permeation of syngas components therethrough. As shown, the membrane is more permeable to the $H_2$ contained in the syngas feedstream than it is to CO. The membrane being more selective for $H_2$ permeation, permeate stream 27 is enriched in $H_2$ as compared to syngas feedstream 1b, and retentate stream 3 is enriched in CO as compared to the syngas feedstream 1b. Accordingly, stream 27 comprises a $H_2$-rich stream and stream 3 comprises a CO-rich stream. The CO-rich stream is then sent to a sub-critical $CO_2$ power plant 33.

Concepts of mixed-gas separation, gas permeability and selectivity are discussed in a number of publications, including "Materials Science of Membranes for Gas and Vapor Separation", Edited by Yampolski et al, 2006 JohnWiley & Sons; "Pure and mixed gas $CH_4$ and n-$C_4H_{10}$ permeability and diffusivity in poly(1-trimethylsilyl-1-propyne)" Roy D. Raharjo et al, Polymer 48 (2007) 7329-7344, 2006 Elsevier Ltd., "Carbon Dioxide Separation through Polymeric Membrane Systems for Flue Gas Applications", Colin A. Scholes et al, Cooperative Research Centre for Greenhouse Gas Technologies, Department of Chemical and Biomolecular Engineering, The University of Melbourne, VIC, 3010, Australia; and "Recent Patents on Chemical Engineering", 2008, 1 52-66, 2008 Bentham Science Publishers Ltd.

The CO-rich stream 3 comprises primarily CO, with minor amounts of carbon dioxide and hydrogen.

After optional contaminant removal (not shown), stream 3 should comprise primarily CO and hydrogen. Stream 3 can also comprise a small amount of $CO_2$ and traces of remaining contaminants. For example, stream 3 can comprise at least about 35%, or at least about 50%, or at least about 65%, or at least about 80% CO. Having the benefit of the disclosure of the present invention, it is seen that the $H_2$ content of stream 3 depends on operational and plant design objectives. On that basis, it is believed that the stream 3 should comprise less than about 55%, or less than about 40%, or less than about 25%, or less than about 10% $H_2$. Stream 3 can also comprise a small amount of $CO_2$ and traces of remaining contaminants. Stream 3 should comprise less than about 0.01%, or less than about 0.001%, or less than about 0.0001%, or less than about 0.00001% of contaminants; and $CO_2$ should comprise less than about 25%, or less than about 15%, or less than about 10%, or less than about 5% of stream 3. Any upper limit for the CO content of stream 3 is considered to be limited only by the ability of technology to economically enrich stream 3 in CO. It is believed that using present technology, stream 3 can comprise up to about 90-95% CO.

Stream 3 is then fed as oxyfuel combustor feedstream 4 to oxyfuel combustor means 5, wherein it is combined and reacted with high purity oxygen stream 8 of at least about 95% purity from air separation unit means 6 for separating oxygen from air following compression in gas turbine compressor section 11 as shown at 34a. As shown in FIG. 2

Figure 3:
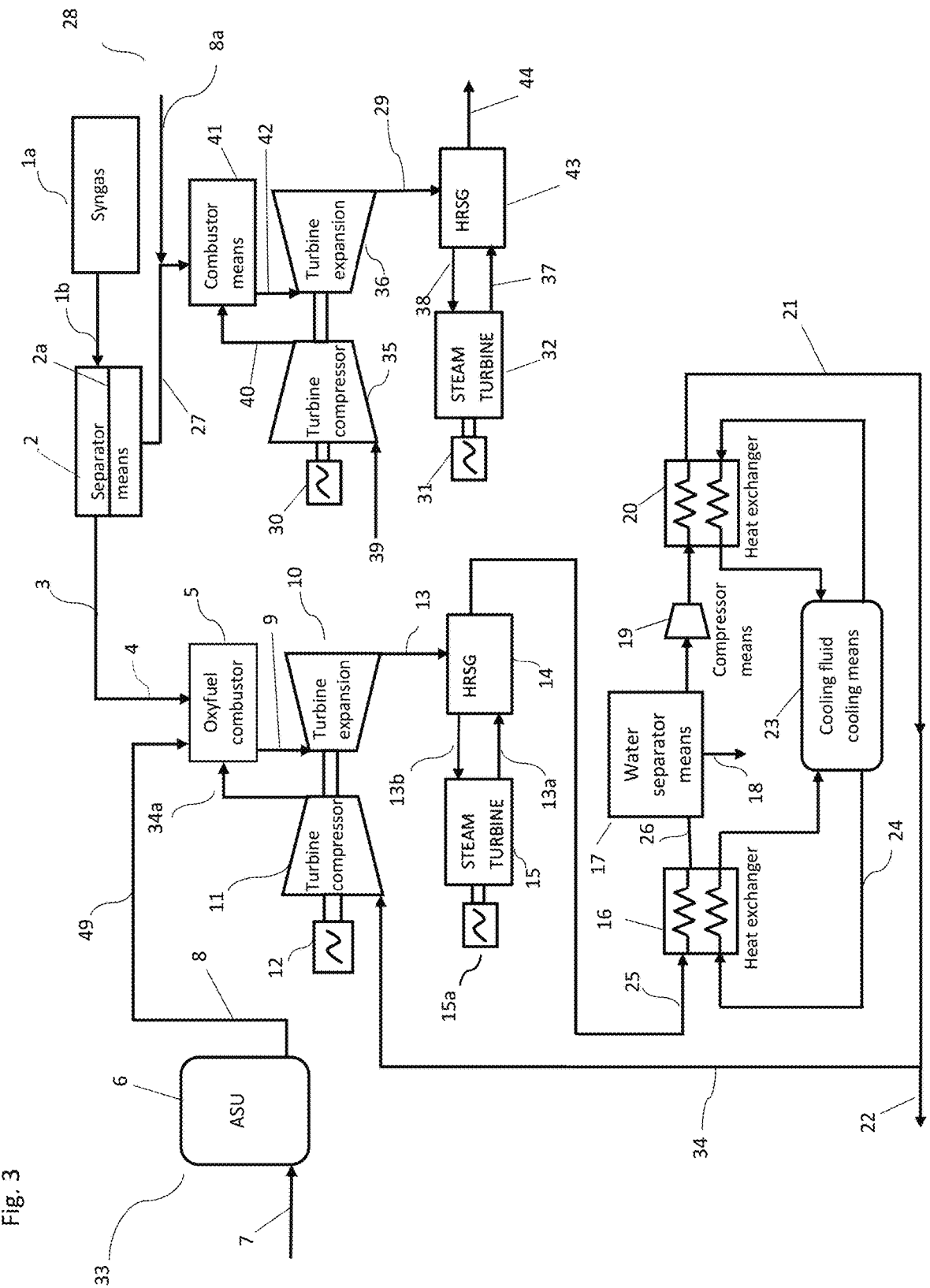
FIG. 3 is a schematic diagram of an alternative embodiment of a NGCC power plant using separated syngas as fuel.

(and FIG. 3), stream 4 is fed directly (other than any optional contaminant removal) to oxyfuel combustor means 5 (to the oxyfuel boiler means 14a in FIG. 3). For example, stream 4 is fed to the oxyfuel combustor means 5 in FIG. 2 (the oxyfuel boiler means 14a in FIG. 3) in the absence of any intervening process step, e.g., expansion in an expander to lower pressure. The oxygen content of stream 8 comprises at least about 95%, at least about 97%, at least about 99%, or at least about 99.5%. As discussed in detail below, sub-critical $CO_2$ exhaust stream 34 is also fed to combustor means 5. Oxygen stream 8 can be premixed with sub-critical $CO_2$ exhaust stream 34 either upstream of compression section 11 or in situ within combustor means 5. Means for premixing in situ are known in the art. For example, see Delimont, Jacob et al, "Direct Fired Oxy-Fuel Combustor for sCO2 Power Cycles, February 2018 Oxy-fuel Working Group presentation, [online] [retrieved Aug. 13, 2019], [https://www.netl.doe.gov/sites/default/files/netl-file/sCO2-WorkingGroup-Feb2018_1MWOxyCombustor.pdf].

Air separation units are well known, for example, as illustrated in U.S. Pat. Nos. 2,548,377, 4,531,371 and 4,382,366. See also, Rong Jiang, Analysis and Optimization of ASU for Oxyfuel Combustion [online] [retrieved Feb. 19, 2019][http://ieaghg.org/docs/General Docs/5oxy%20presentations/Session%207B/7B-05%20-%20R.%20Jiang%20(SASPG%20Ltd.).pdf], and "History and progress in the course of time, [online] [retrieved Feb. 19, 2019] [https://www.linde-engineering.com/en/images/Air_separation_plants_History_and_progress_in_the_course_of_time_tcm19-457349.pdf]. Before the use of a separator means to separate hydrogen from the syngas feedstream 1b in accordance with the present invention, a considerable portion of the oxygen produced in prior air separation units was consumed by reaction with $H_2$ contained in the combustor fuel stream 4. Combustion in accordance with an embodiment of the present invention, results in stream 9 comprised primarily of $CO_2$ working fluid with a substantially reduced amount of steam. The $CO_2$ content of the oxyfuel combustion exhaust in stream 9 will, of course, vary, depending on the amount of $H_2$ recovery in the membrane permeate and the amount of $CO_2$ in the membrane feedstream both of which affects the $CO_2$ content in the $CO_2$ oxyfuel combustion exhaust. In any event, it can comprise at least about 50%, at least about 60% at least about 70%, or at least about 80% $CO_2$, with the balance comprising $H_2O$, and contaminants such as $N_2+Ar$.

Sub-critical $CO_2$ 9 formed in combustor means 5 is then fed to the expansion section 10 of sub-critical $CO_2$ turbine means wherein power is produced to power compression section 11 and electricity generator 12. Expanded sub-critical $CO_2$ exhaust 13 is then fed to known heat recovery steam generator means (HRSG) 14, wherein exhaust 13 indirectly heats a water stream (not shown) to produce working fluid steam stream 13b. The working fluid steam stream 13b is fed to a first, known steam turbine means 15 that powers electricity generator 15a. Condensed steam stream 13a is recycled back to the HRSG 14.

Sub-critical $CO_2$ exhaust 25 from HRSG 14 is then fed to heat exchanger cooling means 16 for indirect cooling with cooling fluid 24. Cooled sub-critical $CO_2$ stream 26 is sent to condensed water separator means 17 for removing condensed water 18 from cooled sub-critical $CO_2$ stream 26. Since stream 26 comprises less water due to the separation of hydrogen from stream 1b by separator means 2, cooling means 23 energy and equipment size requirements can be significantly reduced. Cooling fluid 24 for heat exchangers 16 and 20 is provided by known cooling fluid cooling means 23. The sub-critical $CO_2$ working fluid leaving the water separator 17, is compressed in $CO_2$ compressor means 19, and then cooled in aftercooler heat exchanger means 20 to remove heat of compression. Compressed and cooled sub-critical $CO_2$ stream 21 is then circulated for at least partial capture in stream 22 and recirculation in stream 34 and then forwarded back to oxyfuel combustor means 5. As shown in FIG. 2, at least a first portion 34 of recycle stream 21 is recycled to oxyfuel combustor means 5 and a second portion 22 is captured for storage or further use, for example, in enhanced oil recovery. Recycle stream 34 is a working fluid for the optimum performance of the sub-critical $CO_2$ oxyfuel combustor 5 and the sub-critical $CO_2$ turbine shown at 10 and 11. Recycling the sub-critical $CO_2$ to oxyfuel combustor means 5 enables the sub-critical $CO_2$ power cycle to operate with sub-critical $CO_2$ as the working fluid in the gas turbine. The cycle is operated below the critical point of $CO_2$.

Permeate, $H_2$-rich gas stream 27 is fed, with compression (not shown) as required, to a combined cycle system 28. Stream 27 comprises primarily $H_2$ with small quantities of $CO_2$, CO and trace quantities of $H_2O$. Stream 27 can comprise at least about 40%, or at least about 50% $H_2$ or at least about 60%, or at least about 85% $H_2$. Having the benefit of the disclosure of the present invention, it is seen that the CO content of stream 27 depends on operational and plant design objectives. On that basis, it is believed that stream 27 should comprise less than about 10% CO, or less than about 5% CO, or less than about 3% CO, or less than about 1% CO with the balance comprising other components such as $CO_2$ and $H_2O$. Any upper limit for the $H_2$ content of stream 27 is considered to be limited only by the ability of technology to economically enrich stream 27 in $H_2$. It is believed that using present technology, stream 27 can comprise up to about 90-95% $H_2$. As shown in FIG. 2, gas stream 27 can be premixed with inert diluent stream 8a. This, for example, can add combustion benefits to air-fuel combustor means 41 by adjusting the flammability limit and heating value of the feedstream to combustor means 41. Any known inert diluent can be used such as, by way of nonlimiting example, $N_2$, steam or $CO_2$. In the present process $N_2$ byproduct from air separation unit 6 is readily available to supply stream 8a for this purpose. If needed, a portion of $CO_2$ or steam from other parts of the process could be used to supply or supplement $N_2$ in diluent stream 8a.

Instead of $H_2$-rich gas stream 27 being fed to a combined cycle system 28, stream 27 can be fed to any known process, for example by pressure swing adsorption or palladium proton membrane treatment, for further enrichment to high purity $H_2$ and further use. By way of non-limiting example, the high purity $H_2$ can be used for 1. Zero emission transportation fuel in an internal combustion engine or in a fuel cell to power an electric motor,
2. Gas welding,
3. Hydrotreating to remove sulfur in petroleum refining,
4. Chemicals production,
5. Generation of electricity,
6. As a reducing agent,
7. Potentiometry and Chemical analysis,
8. In gas chromatography, or
9. Rocket fuel for space programs As shown in FIG. 2, gas stream 27 is fed as an air-fuel combustor feedstream to air-fuel combustor means 41 of a known air-fuel gas turbine means comprising known turbine compressor section 35 and expansion section 36. As shown, working fluid air stream 39 is fed to compressor section 35. Compressed air stream 40 is fed to combustor means 41 wherein the compressed air and fuel gas stream 27 are mixed and combusted to form gas turbine working fluid 42. Working fluid 42 is then fed to expansion section 36 of the air-fuel gas turbine means wherein the working fluid expands, producing power which, in turn, drives electricity generator 30 and compressor section 35. Expanded exhaust 29 is then fed to known heat recovery steam generator means (HRSG) 43, wherein exhaust 29 indirectly heats a water stream to produce steam stream working fluid 38. The steam working fluid 38 is fed to known steam turbine means 32 that powers electricity generator 31. Condensed steam stream 37 is recycled back to the HRSG 43.

While known air-fuel gas turbines typically burn carbonaceous fuels (e.g., natural gas or syngas) mixed with air to form a working fluid, processes in accordance with the present invention burn primarily $H_2$ with substantially reduced percentages of $CO_2$ and CO, and thus little or virtually no carbon dioxide is exhausted to the ambient environment in stream 44.

According to an embodiment a process comprises:
a. feeding a separator feedstream comprising syngas from natural gas to separator means,
b. separating the separator feedstream in the separator means to form a first, CO-rich stream and a second, $H_2$-rich stream,
c. feeding the first, CO-rich stream as an oxyfuel boiler feedstream to oxyfuel boiler means for generating steam, and
d. feeding the steam to first steam turbine means for generating power.

With reference to illustrative FIG. 3 of the drawings, 1a is a source for converting natural gas to syngas feedstream for feeding to separator means 2. Separator means 2 can be any known separator means suitable for the purpose of separating the syngas feedstream into a first, CO-rich stream 3 and a second, $H_2$-rich stream 26. For example, separator means can be membrane separator means or pressure swing adsorption means. Membrane separation is preferred.

As illustrated in FIG. 3, separator means 2 comprises membrane means 2a disposed therewithin. The syngas feedstream is fed to separator means on one side of the membrane means and is separated into separate streams by selective permeation of syngas components therethrough. As shown, the membrane is more permeable to the $H_2$ contained in the syngas feedstream than it is to CO. The membrane being more selective for $H_2$ permeation, permeate stream 26 is enriched in $H_2$ as compared to syngas feedstream 1b, and retentate stream 3 is enriched in CO as compared to the syngas feedstream 1b. Accordingly, stream 26 comprises a $H_2$-rich stream and stream 3 comprises a CO-rich stream. The CO-rich stream 3 is the same as already described above with respect to FIG. 2. The CO-rich stream is sent to a sub-critical $CO_2$ power plant 33a.

Stream 3 is fed as oxyfuel boiler feedstream 4 to oxyfuel boiler means 14a, wherein stream 3 is combined and reacted with high purity oxygen stream 8 of at least about 95% purity from air separation unit means 6 for separating oxygen from air. Oxyfuel boilers are known, for example, as disclosed in U.S. Pat. Nos. 7,909,898 and 8,088,196. As shown in FIG. 3, CO-rich stream 3, high purity oxygen stream 8 and recycled sub-critical $CO_2$ stream 34 are fed to oxyfuel boiler means 14a. It is believed that CO-rich stream 3, high purity oxygen stream 8 and recycled sub-critical $CO_2$ stream 34 can be fed separately to oxyfuel boiler means 14a. The high purity oxygen stream 8 and recycled sub-critical $CO_2$ stream 34 can be premixed, either upstream of oxyfuel boiler means 14a as shown or in situ within oxyfuel boiler means 14a.

The reaction of the CO-rich stream 4 with high purity oxygen 8 in the oxyfuel boiler means 14a produces heated sub-critical $CO_2$ which is indirectly contacted with water therein to produce steam working fluid 13b. Steam working fluid 13b flows to steam generator 15 wherein the steam expands to produce power to drive electricity generator 15a. Cooled/condensed steam 13a is recycled back to boiler means 14a for reheating with makeup water (not shown) being added as needed to the working fluid 13a.

Oxyfuel boiler means sub-critical $CO_2$ exhaust 25 is fed to heat exchanger cooling means 16 for indirect cooling with cooling fluid 36. Cooled sub-critical $CO_2$ stream 26 is sent to condensed water separator means 17 for removing condensed water 18 from cooled sub-critical $CO_2$ stream 26. Cooling fluid 36 for heat exchanger cooling means 16 and 20 is provided by cooling fluid cooling means 23. Since stream 26 comprises less water due to the separation of hydrogen from stream 1b by separator means 2, cooling means 23 energy and equipment size requirements can be significantly reduced. The sub-critical $CO_2$ working fluid leaving the water separator 17, is compressed in sub-critical $CO_2$ compressor means 19, and then cooled in aftercooler means 20 to remove heat of compression. Compressed and cooled sub-critical $CO_2$ is circulated for at least partial capture in stream 22 and recirculation in stream 34 back to oxyfuel boiler means 14a. As shown in FIG. 3, at least a first portion 34 of recycle stream 21 is recycled to oxyfuel boiler means 14a and a second portion 22 is captured for storage or further use, for example, in enhanced oil recovery.

Permeate, $H_2$-rich gas stream 26 is fed, with compression (not shown) as required, to a combined cycle system 28. Gas stream 26 comprises primarily $H_2$ with small quantities of $CO_2$ and CO and trace quantities of $H_2O$. Stream 26 can comprise at least about 40%, or at least about 50%, or at least about 65%, or at least about 85% $H_2$. Having the benefit of the disclosure of the present invention, it is seen that the CO content of stream 26 depends on operational and plant design objectives. On that basis, it is believed that stream 26 should comprise less than about 10% CO, or less than about 5% CO, or less than about 3% CO, or less than about 1% CO with the balance comprising other components such as $CO_2$ and $H_2O$. Any upper limit for the $H_2$ content of stream 26 is considered to be limited only by the ability of technology to economically enrich stream 26 in $H_2$. It is believed that using present technology, stream 26 can comprise up to about 90-95% $H_2$. As shown in FIG. 3, gas stream 26 can be premixed with inert diluent stream 8a. This, for example, can add combustion benefits to air-fuel combustor means 41 by adjusting the flammability limit and heating value of the feedstream to combustor means 41. Any known inert diluent can be used such as, by way of nonlimiting example, $N_2$, steam or $CO_2$. In the present process $N_2$ byproduct from air separation unit 6 is readily available to supply stream 8a for this purpose. If needed, a portion of steam from other parts of the process could be used to supply or supplement $N_2$ in diluent stream 8a.

Instead of $H_2$-rich gas stream 26 being fed to a combined cycle system 28, stream 26 can be fed to any known process, for example by pressure swing adsorption or palladium proton membrane treatment, for further enrichment to high purity $H_2$ and further use. By way of non-limiting example, the high purity $H_2$ can be used for
1. Zero emission transportation fuel in an internal combustion engine or in a fuel cell to power an electric motor,
2. Gas welding,
3. Hydrotreating to remove sulfur in petroleum refining,
4. Chemicals production,
5. Generation of electricity,
6. As a reducing agent,
7. Potentiometry and Chemical analysis,
8. In gas chromatography, or
9. Rocket fuel for space programs As shown in FIG. 3, gas stream 26 is fed as an air-fuel combustor feedstream to air-fuel combustor means 41 of a known air-fuel gas turbine means comprising known turbine compressor section 35 and compressor expansion section 36. As shown, working fluid air stream 39 is fed to compressor section 35. Compressed air stream 40 is fed to combustor means 41 wherein the compressed air and fuel gas stream 26 are mixed and combusted to form gas turbine working fluid 42. Working fluid 42 is then fed to expansion section 36 of the air-fuel gas turbine means wherein the working fluid expands, producing power which, in turn, drives electricity generator 30 and compressor section 35. Expanded exhaust 29 is then fed to known heat recovery steam generator means (HRSG) 43, wherein exhaust 29 indirectly heats a water stream to produce working fluid steam stream 38. Working fluid steam stream 38 is fed to a known steam turbine system 32 that powers electricity generator 31. Condensed steam stream 37 is recycled back to the HRSG 43.

While known gas turbines typically burn carbonaceous fuels (e.g., natural gas or syngas) mixed with air to form a working fluid, processes in accordance with the present invention burn primarily $H_2$ with substantially reduced percentages of $CO_2$ and CO, and thus little or virtually no carbon dioxide is exhausted to the ambient environment in stream 44.

EXAMPLES

Below are Nonlimiting Illustrative Examples

Example 1

Example 1

$CO_2$ Phase Diagram

Figure 4:
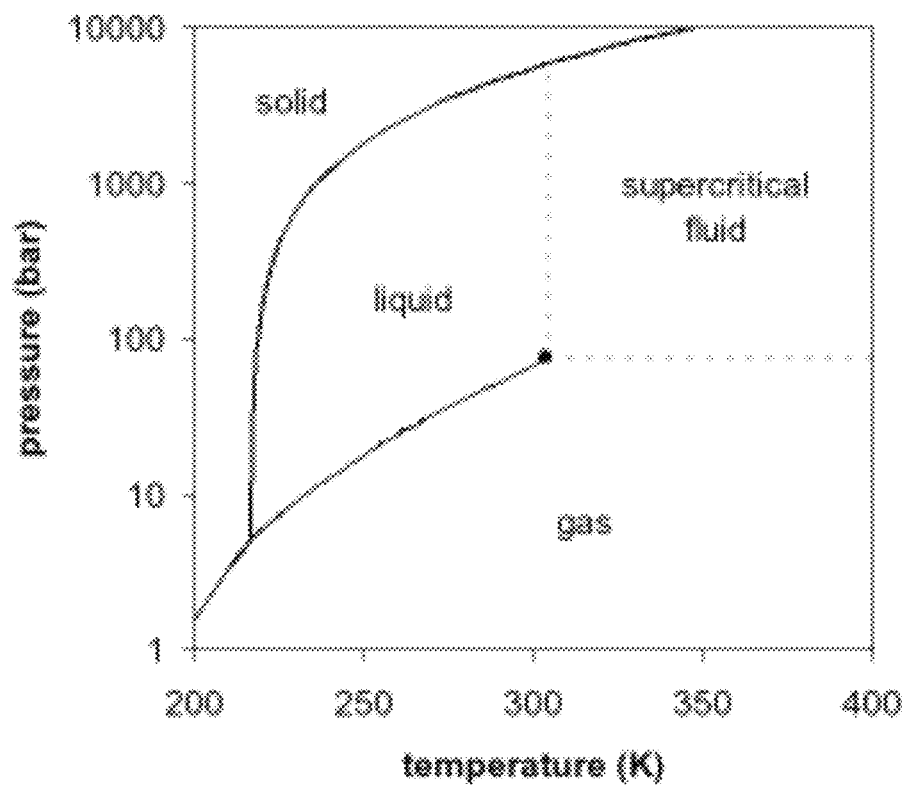
FIG. 4 is a phase diagram for carbon dioxide.

The phase diagram in FIG. 4 shows the pressures and temperatures for the four states of matter for carbon dioxide, i.e., gas, liquid, solid and supercritical fluid. The supercritical point occurs at a pressure of 73.9 bar and a temperature of 304.25° K where carbon dioxide gas, liquid and supercritical fluid coexist. Supercritical carbon dioxide has properties of both a gas and a liquid. Sub-critical carbon dioxide's state of matter is defined as gas in the diagram, existing below the supercritical pressure of 73.9 bar, or existing at sub-critical pressure, and between the temperatures of 200° K or −73° C. and greater than 400° K or 127° C. The carbon dioxide triple point occurs at 5.18 bar and 216.6° K where carbon dioxide gas, liquid and solid coexist.

Example 2

Figure 5:
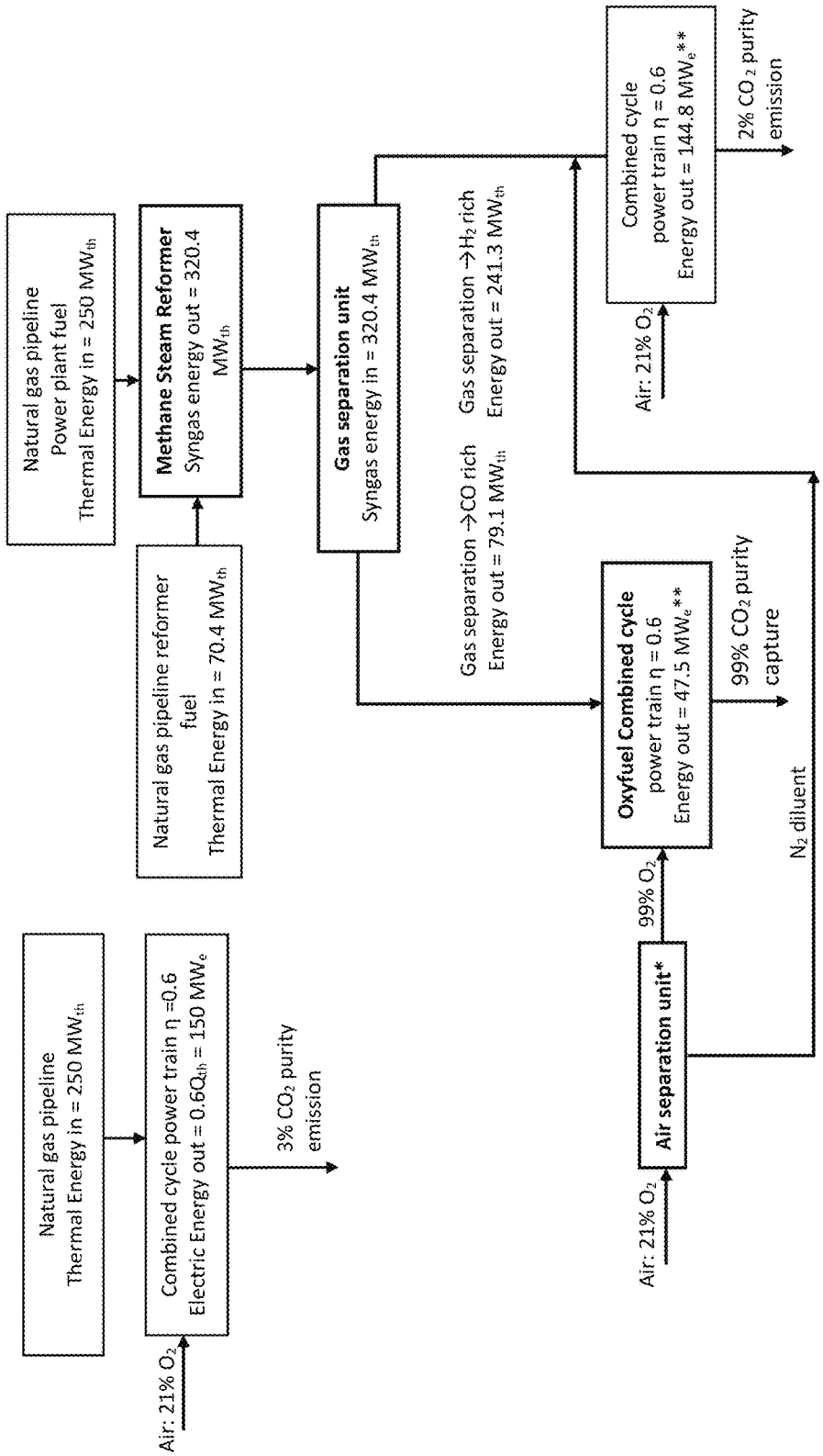
FIG. 5 is a block diagram comparing a 150 megawatts NGCC power plant with one retrofitted according to an embodiment of the invention.

FIG. 5 presents two block flow diagrams comparing a 150 MWe (megawatts as an electric energy rate) NGCC power plant on the left and on the right the same plant retrofitted according to an embodiment of the invention previously described. In the 150 MWe NGCC plant pipeline natural gas is directed into the plant's combined cycle power train at the rate of 250 MWth wherein it is combusted with air and converted at 60% thermal efficiency to 150 MWe.

In the retrofitted 150 MWe NGCC power plant the 250 MWth (megawatts as a thermal energy rate) pipeline natural gas is first directed to a steam methane ($CH_4$) reformer wherein $CH_4$ is reformed into syngas according to the stoichiometric reaction:

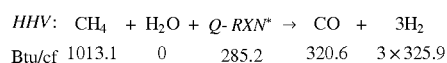

| | $HHV$: | $CH_4$ | + | $H_2O$ | + | $Q\text{-}RXN^*$ | → | CO | + | $3H_2$ |
|---|---|---|---|---|---|---|---|---|---|---|
| | Btu/cf | 1013.1 | | 0 | | 285.2 | | 320.6 | | 3×325.9 |

*Heat of reaction calculated by difference from equation energy balance

Since the reaction is endothermic, the Q-RXN (heat of reaction) is calculated by difference to satisfy the following energy balance:

| | Thermal energy input | | Thermal energy output |
|---|---|---|---|
| $CH_4$ | 1013.1 Btu/cf | CO | 320.6 Btu/cf |
| Q-RXN | 285.2 Btu/cf | $3H_2$ | 977.7 Btu/cf |
| | 1298.3 Btu/cf | | 1298.3 Btu/cf |

Reforming $CH_4$ is 100% energy efficient. Stoichiometrically the syngas thermal energy is 28% greater than the natural gas thermal energy according to the ratio 1,298.3/1,013.1=1.28. Therefore, according to the block flow diagram, the thermal energy produced in the reformer is 28% greater than the thermal energy supplied by the pipeline, i.e., 320.4 MWth/250 MWth=1.28. The syngas produced in the reformer is next directed to a gas separation unit wherein the syngas is separated into a 79.1 MWth CO rich stream and a 241.3 MWth $H_2$ rich stream. The CO rich stream is then directed to a new oxyfuel combined cycle power train wherein 47.5 MWe electric power is produced at 60% thermal conversion efficiency. The $H_2$-rich stream is then directed to the existing air-fuel combined cycle power train wherein 144.8 MWe electric power is produced at 60% thermal conversion efficiency. The total electric power output of 192.2 MWe is 1.28 times greater than the 150 MWe electric power output produced by the un-retrofitted NGCC power plant. The cash flow generated by the additional 42.2 MWe of electric power output from the retrofitted plant can amortize the fixed capital costs of the reformer, the gas separation unit, oxyfuel combined cycle and the air separation unit. Instead of having a parasitic power load to capture $CO_2$, the present invention generates additional power while capturing $CO_2$.

The methane reformer energy balances are further described and explained at the following website:https://inside.mines.edu/~jjechura/EnergyTech/07_Hydrogen_from_SMR.pdf In a summary table below, the retrofitted NGCC power plant has the following characteristic power plant heat rates:

| Retrofitting a 150 MW$_e$ 60% Efficient NGCC Power Plant with a NG Reformer to Increase Net Power Output by 28%: | | | | | |
|---|---|---|---|---|---|
| Gas Fuel | Heat rate | unit | $Q_{th}$* | MW$_{th}$ | MW$_e$ |
| Pipeline NG in | 853,000,000 | Btu/h | 1.000 | 250.0 | 150.0 |
| Reformer CO out | 269,935,643 | Btu/h | 0.316 | 79.1 | 47.5 |
| Reformer H$_2$ out | 823,194,255 | Btu/h | 0.965 | 241.3 | 144.8 |
| Total reformer CO + H$_2$ out | 1,093,129,898 | Btu/h | 1.28 | 320.4 | 192.2 |
| Total reformer out/pipeline in | 1.28 | | 1.28 | 1.28 | 1.28 |

*Unitary thermal power

Example 3

A detailed explanation of the chemistry involved in converting natural gas to syngas by reforming natural gas in a steam methane reformer (SMR) or auto-thermal reformer (ATR) is given below:

| REFORMING NATURAL GAS IS 100% ENERGY EFFICIENT | | | | | | | |
|---|---|---|---|---|---|---|---|
| HHV: | CH$_4$ | + H$_2$O | + Q-RXN* | → | CO | + | 3H$_2$ |
| Btu/cf | 1013.1 | 0 | 285.2 | | 320.6 | | 3 × 325.9 |

Conversion Efficiency HHV Basis
Production: $(N_{CO} + N_{H2})/N_{CH4}$ = 4 mol/mol
Just from stoichiometry: $\eta$ = (320.6 + 3 × 325.9)/(1 × 1013.1) = 1.28
Include heat of reaction: $\eta$ = (320.6 + 3 × 325.9)/(1 × 1013.1 + 285.2) = 1.00
Use Additional CH$_4$ to Provide Q-RXN
Additional CH$_4$ fuel: 0.282 mol CH$_4$ fuel/mol CH$_4$ reactant
Production: $(N_{CO} + N_{H2})/N_{CH4}$ = 4/(1 + 0.282) = 3.12 mol/mol
Efficiency including fuel: $\eta$ = (320.6 + 3 × 325.9)/(1.282 × 1013.1) = 1.00
In other words, the thermal energy balance in Btu/cf for
the reformer's endothermic reaction is 100% efficient:

| Energy input | | Energy output | |
|---|---|---|---|
| CH$_4$ | 1013.1 | CO | 320.6 |
| CH$_4$ Q-RXN | 285.2 | 3H$_2$ | 977.7 |
| | 1298.3 | | 1298.3 |

Stoichiometric energy ratio = [320.6 + 3 × (325.9)]/1013.1 = 1.2815
Conservation of energy requires CH$_4$ Q-RXN = 0.2815 × 1013.1 = 285.2

*Fuel reaction heat input from equation energy balance

For example: A NGCC power plant with a name plate output of 150 MWe burns NG in three 50 MWe combined cycle power trains. If the NG is reformed into syngas and the syngas is separated into a H$_2$ rich fuel and a CO rich fuel, then the three existing combined cycle powertrains burning the H$_2$ rich fuel generate 144.759 MWe and a new combined cycle power train burning the CO rich fuel generates 47.468 MWe. The new power output is 192.227 MWe which is 28.15% greater that the original name plate output of 150 MWe. This incerease in output balances against the NG fuel required for Q-RXN to reform the NG into syngas. Retrofitting an existing NGCC power to use separated syngas made from reformed NG increases MWe output by 28.15% and is 100% thermal energy efficient.

Example 4

TABLE 3

Figure 6:
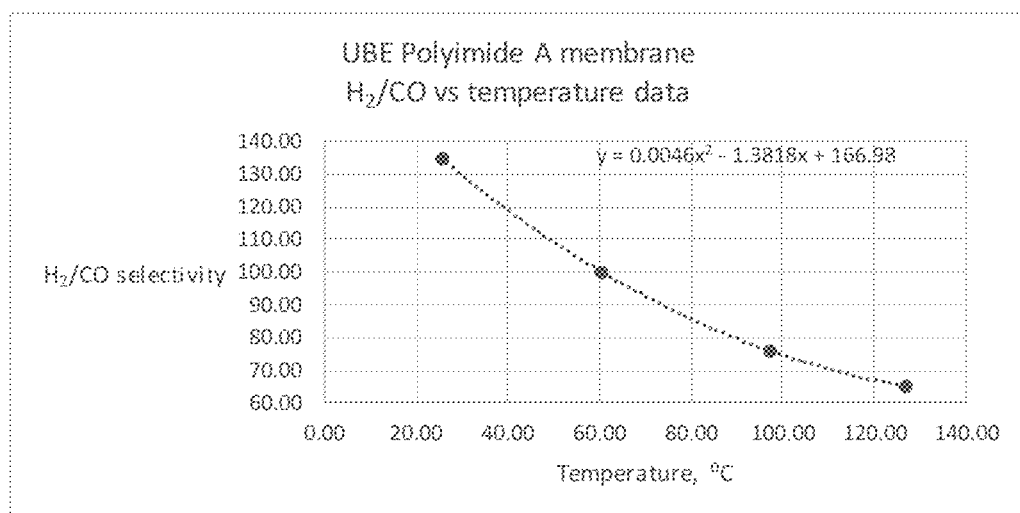
FIG. 6 is a graph of Polyimide Membrane $H_2$ and CO Permeability and Selectivity vs. Temperature.

| UBE Industries, Ltd., Polyimide Membrane H$_2$ and CO Permeability and Selectivity vs. Temperature Data (see FIG. 6) | | | | | | | | | |
|---|---|---|---|---|---|---|---|---|---|
| 1000T$^{-1}$(K)$^{-1}$ | | | selectivity | GPU[1] | GPU[1] | GPU[2] | GPU[2] | Barrer[3] | Barrer[3] |
| ° F. | x | ° C. | H$_2$/CO | H$_2$ | CO | H$_2$ ×10$^{-6}$ | CO ×10$^{-6}$ | H$_2$ (×10$^{-10}$) | CO (×10$^{-10}$) |
| 77.91 | 3.35 | 25.51 | 134.78 | 0.31 | 0.002 | 4.135 | 0.031 | 4.135 | 0.0307 |
| 140.60 | 3.00 | 60.33 | 100.00 | 0.80 | 0.008 | 10.671 | 0.107 | 10.671 | 0.1067 |
| 207.27 | 2.70 | 97.37 | 75.95 | 1.80 | 0.024 | 24.010 | 0.316 | 24.010 | 0.3161 |
| 260.60 | 2.50 | 127.00 | 65.00 | 2.60 | 0.040 | 34.681 | 0.534 | 34.681 | 0.5336 |
| 212.00 | 2.68 | 100.00 | 74.88 | | | | | | |

UBE membrane maximum operating temperature is 100° C. Selectivity for 100° C. calculated by equation

[1] P/I (mm$^3$/s/m$^2$/Pa)
[2] P/I (cm$^3$/s/cm$^2$/cm Hg)
[3] P (cm$^3$ − cm)/s/cm$^2$/cm Hg) when I = 0.0001 cm membrane thickness Source: Polyimide Membranes-Applications, Fabrication, and Properties by Haruhiko Ohya, Vladislav V. Kudryavtsev and Svetlana I. Semenova (Jan. 30, 1997) page 250 Gordan and Breach Science Publishers S.A., Emmaplein 5, 1075AW Amsterdam, The Netherlands Pg. 250, FIG. 6.7, Temperature of pure gas permeation rates through asymmetric polyimide hollow fiber membrane . . . by UBE Industries, Ltd. (From Haraya, K. et al., Gas Separation and Purification, 1, 4 (1987))

ness and pressure differential across the membrane and is given as volumetric flow times membrane thickness, per unit area per second per unit differential pressure across the membrane. Selectivity is the ratio of the respective GPU or Barrer units, e.g., $H_2/CO$ selectivity at 97.37° C. of 75.95 is determined by following ratio:

$$24.1010 \text{ cm}^3/\text{cm}^2/\text{s/cm Hg divided by } 0.316^3/\text{cm}^2/\text{s/cm Hg}=75.95$$

TABLE 4

Figure 7:
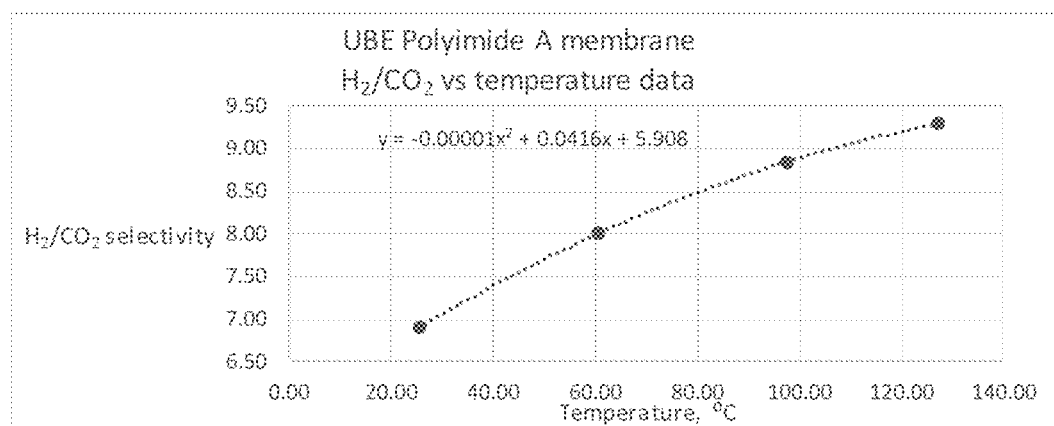
FIG. 7 is a graph of the same membrane for $H_2$ and $CO_2$ Permeability and Selectivity vs. Temperature.

UBE Industries, Ltd., Polyimide Membrane $H_2$ and $CO_2$ Permeability and Selectivity vs. Temperature Data (see FIG. 7)

| $1000T^{-1}(K)^{-1}$ | | | selectivity | $GPU^1$ | $GPU^1$ | $GPU^2$ | $GPU^2$ | $Barrer^3$ | $Barrer^3$ |
|---|---|---|---|---|---|---|---|---|---|
| ° F. | x | ° C. | $H_2/CO_2$ | $H_2$ | $CO_2$ | $H_2 \times 10^{-6}$ | $CO_2 \times 10^{-6}$ | $H_2 (\times 10^{-10})$ | $CO_2 (\times 10^{-10})$ |
| 77.91 | 3.35 | 25.51 | 6.89 | 0.31 | 0.045 | 4.135 | 0.600 | 4.135 | 0.6003 |
| 140.60 | 3.00 | 60.33 | 8.00 | 0.80 | 0.100 | 10.671 | 1.334 | 10.671 | 1.3339 |
| 207.27 | 2.70 | 97.37 | 8.82 | 1.80 | 0.204 | 24.010 | 2.721 | 24.010 | 2.7212 |
| 260.60 | 2.50 | 127.00 | 9.29 | 2.60 | 0.280 | 34.681 | 3.735 | 34.681 | 3.7349 |
| 212.00 | 2.68 | 100.00 | 9.97 | UBE membrane maximum operating temperature is 100° C. Selectivity for 100° C. calculated by equation | | | | | |

[1]P/I ($mm^3/s/m^2/Pa$)
[2]P/I ($cm^3/s/cm^2/cm$ Hg)
[3]P ($cm^3 - cm)/s/cm^2/cm$ Hg) when I = 0.0001 cm membranw thickness Source: Polyimide Membranes-Applications, Fabrication, and Properties by Haruhiko Ohya, Vladislav V. Kudryavtsev and Svetlana I. Semenova (Jan. 30, 1997) page 250 Gordan and Breach Science Publishers S.A., Emmaplein 5, 1075AW Amsterdam, The Netherlands, Pg. 250, FIG. 6.7, Temperature of pure gas permeation rates through asymmetric polyimide hollow fiber membrane . . . by UBE Industries, Ltd. (From Haraya, K. et al., Gas Separation and Purification, 1,4(1987))

In Tables 3 and 4, UBE Industries, Ltd. (UBE) is a Japanese multinational manufacturer of polyimide hydrogen separation membranes and have supplied membranes globally to industry for many years.

$H_2$ and CO permeability values versus temperature are presented in Table 3 and $H_2$ and $CO_2$ permeability values are presented in Table 4. The GPU unit, also known as permeance, is a pressure normalized steady state flux for a given membrane thickness and is given as volumetric flow per unit area per second per unit differential pressure across the membrane. The Barrer unit, also known as permeability, is a steady state flux normalized for both membrane thickness and pressure differential across the membrane and is given as volumetric flow times membrane thickness, per unit area per second per unit differential pressure across the membrane. Selectivity is the ratio of the respective GPU or Barrer units, e.g., $H_2/CO$ selectivity at 97.37° C. of 75.95 is determined by following ratio:

It can be seen from the Tables 3 and 4 that $H_2/CO$ selectivity is more sensitive to temperature change than $H_2/CO_2$ selectivity. The maximum operating temperature for the UBE polyimide membrane is 150° C. Operating an UBE polyimide membrane separator means at the maximum temperature of 150° C. increases overall system thermal efficiency. Further, the trendline equation in Table 3 calculates a $H_2/CO$ selectivity of 63.33 at 150° C., a selectivity reduction of only 2.6% compared with 127° C. Furthermore, based a trendline algorithm for temperature vs. $H_2$ GPU values in Table 3, $H_2$ GPU is increased by about 30% at 150° C. compared with 127° C. In general, mixed gas selectivity will be lower than pure gas selectivity.

Example 5

TABLE 5

SRI International, Polybenzimidazole (PBI) Membrane $H_2$, CO and $CO_2$ mixed gas Permeability and Selectivity vs. Temperature Data

| ° F. | ° C. | selectivity $H_2/CO$ | $GPU^1$ $H_2 \times 10^{-6}$ | $GPU^1$ $CO \times 10^{-6}$ | $Barrer^2$ $H_2 (\times 10^{-10})$ | $Barrer^2$ $CO (\times 10^{-10})$ |
|---|---|---|---|---|---|---|
| 437.00 | 225.00 | 103.0 | 80.0 | 0.775 | 80.0 | 0.775 |

[1]P/I (cm3/s/cm2/cm Hg)
[2]P ($cm^3 - cm)/s/cm^2/cm$ Hg when I = 0.0001 cm membrane thickness

| ° F. | ° C. | selectivity $H_2/CO_2$ | $GPU^1$ $H_2 \times 10^{-6}$ | $GPU^1$ $CO_2 \times 10^{-6}$ | $Barrer^2$ $H_2 (\times 10^{-10})$ | $Barrer^2$ $CO_2 (\times 10^{-10})$ |
|---|---|---|---|---|---|---|
| 437.00 | 225.00 | 40.0 | 80.0 | 2.00 | 80.0 | 2.00 |

[1]P/I (cm3/s/cm2/cm Hg)
[2]P ($cm^3 \times cm)/s/cm^2/cm$ Hg) when I = 0.0001 cm membrane thickness PBI Data:

The PBI data in Table 4 is available at: https://www.netl.doe.gov/sites/default/files/2017-12/2I-S-Jayaweera2-SRI-PBI-Hollow-Fiber-Membranes.pdf

Example 6

Non-limiting examples of mixed gas selectivity concentrations of the first separated CO-rich stream and the second separated $H_2$-rich stream achieved by the Ube membrane and the Generon® membrane.

| | $CO_2$ conc. | CO conc. | $CH_4$ conc. | $Ar/N_2$ conc. | $H_2$ conc. | $H_2S$ conc. | $H_2O$ conc. |
|---|---|---|---|---|---|---|---|
| Ube membrane | | | | | | | |
| Cooled syngas Feed, 20° C. | 2.88% | 23.98% | 0.96% | 0.20% | 71.93% | 0.00% | 0.05% |
| First CO-rich stream, 20° C. | 3.82% | 56.80% | 2.38% | 0.48% | 36.52% | 0.00% | 0.00% |
| Second $H_2$-rich stream, 20° C. | 2.26% | 2.25% | 0.02% | 0.02% | 95.37% | 0.00% | 0.08% |
| Cooled syngas Feed, 30° C. | 2.88% | 23.97% | 0.96% | 0.20% | 71.90% | 0.00% | 0.09% |
| First CO-rich stream, 30° C. | 3.86% | 67.06% | 2.88% | 0.57% | 25.63% | 0.00% | 0.00% |
| Second $H_2$-rich stream, 30° C. | 2.41% | 3.19% | 0.04% | 0.02% | 94.21% | 0.00% | 0.13% |
| Cooled syngas Feed, 40° C. | 2.88% | 23.96% | 0.96% | 0.20% | 71.88% | 0.00% | 0.12% |
| First CO-rich stream, 40° C. | 3.83% | 64.90% | 2.84% | 0.56% | 27.87% | 0.00% | 0.01% |
| Second $H_2$-rich stream, 40° C. | 2.41% | 4.09% | 0.05% | 0.02% | 93.25% | 0.00% | 0.17% |
| Cooled syngas Feed, 50° C. | 2.87% | 23.92% | 0.96% | 0.20% | 71.76% | 0.00% | 0.29% |
| First CO-rich stream, 50° C. | 4.04% | 70.87% | 3.14% | 0.61% | 21.33% | 0.00% | 0.01% |
| Second $H_2$-rich stream, 50° C. | 2.39% | 4.55% | 0.06% | 0.03% | 92.56% | 0.00% | 0.41% |
| Generon membrane | | | | | | | |
| Cooled syngas Feed, 38° C. | 2.87% | 23.99% | 0.97% | 0.19% | 71.97% | 0.00% | 0.01% |
| First CO-rich stream, 38° C. | 2.93% | 89.53% | 3.88% | 0.76% | 2.90% | 0.00% | 0.00% |
| Second $H_2$-rich stream, 38° C. | 2.85% | 5.42% | 0.15% | 0.03% | 91.54% | 0.00% | 0.01% |
| Cooled syngas Feed, 38° C. | 2.87% | 23.99% | 0.97% | 0.19% | 71.97% | 0.00% | 0.01% |
| First CO-rich stream, 38° C. | 3.02% | 73.49% | 2.93% | 0.58% | 19.98% | 0.00% | 0.00% |
| Second $H_2$-rich stream, 38° C. | 2.81% | 3.26% | 0.15% | 0.03% | 93.74% | 0.00% | 0.13% |
| Cooled syngas Feed, 38° C. | 2.87% | 23.99% | 0.97% | 0.19% | 71.97% | 0.00% | 0.01% |
| First CO-rich stream, 38° C. | 3.28% | 67.29% | 2.69% | 0.53% | 26.21% | 0.00% | 0.00% |
| Second $H_2$-rich stream, 38° C. | 2.67% | 2.83% | 0.13% | 0.02% | 94.34% | 0.00% | 0.01% |
| Cooled syngas Feed, 57° C. | 2.87% | 23.99% | 0.97% | 0.19% | 71.97% | 0.00% | 0.01% |
| First CO-rich stream, 57° C. | 3.74% | 59.84% | 2.51% | 0.49% | 33.42% | 0.00% | 0.00% |
| Second $H_2$-rich stream, 57° C. | 2.38% | 3.69% | 0.10% | 0.02% | 93.79% | 0.00% | 0.02% |

Example 7

The present inventor initiated a study to compare membrane performance of an Ube commercial membrane (at 40° C.) and a Generon® commercial membrane (at 38° C.) in separating a syngas. The mixed gas selectivity of these membranes was compared for mixed gas $H_2/CO_2$ (shifted syngas) vs. mixed gas $H_2/CO$ separations (unshifted syngas).

Figure 8:
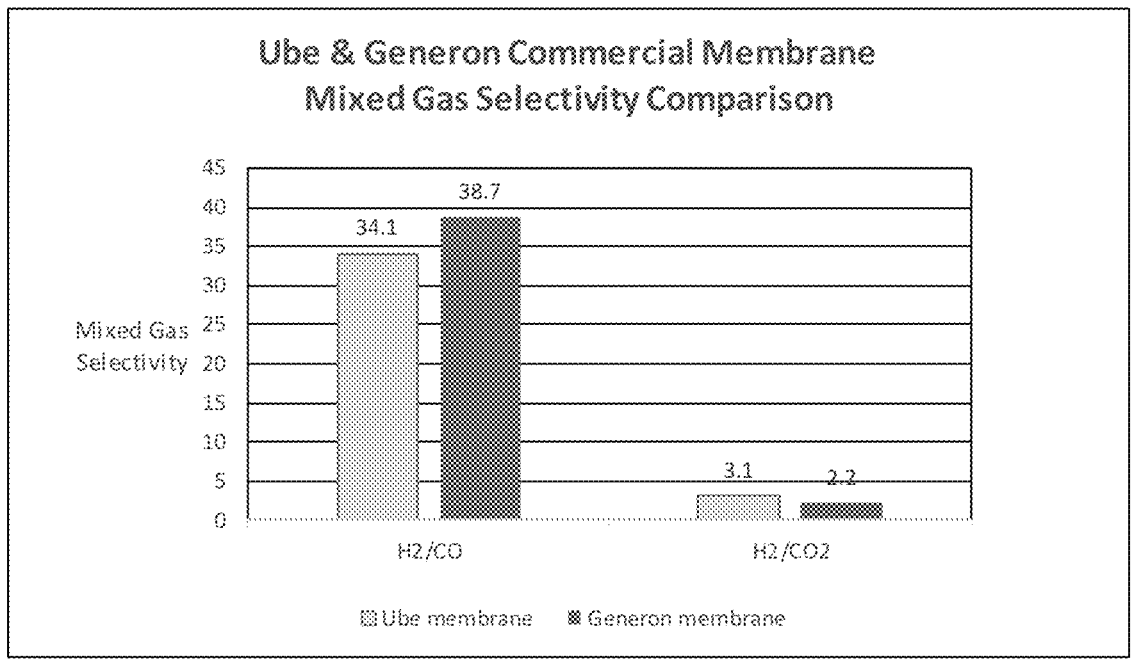
FIG. 8 is a graph of membrane performance comparing unshifted and shifted syngas.

Membrane Performance Comparison on Unshifted and Shifted Syngas:

As can be seen from the graph in FIG. 8, $H_2/CO$ mixed gas selectivity in the Ube and Generon® commercial gas separation membranes for separating unshifted syngas is substantially higher than their $H_2/CO_2$ mixed gas selectivity for separating shifted syngas. The increase in mixed gas selectivity is greater by more than an order of magnitude, enabling higher recoveries and purities in unshifted syngas for the respective separated gases.

As an example, for a given unshifted syngas feed composition, the Ube membrane recovers 87.3% of the $H_2$ at 93.3% purity in the permeate and 88.5% of the CO at 64.9% purity in the retentate. In contrast, for a given shifted syngas feed composition, the Ube membrane recovers 89.2% of the $H_2$ at 82.8% purity in the permeate and 45.1% of the $CO_2$ at 52.2% purity in the retentate.

As another example, for a given unshifted syngas feed composition, the Generon® membrane recovers 91.8% of the $H_2$ at 93.7% purity in the permeate and 90.4% of the CO at 73.5% purity in the retentate. In contrast, for a given shifted syngas feed composition, the Generon® membrane recovers 91.8% of the $H_2$ at 79.1% purity in the permeate and 28.1% of the $CO_2$ at 45.9% purity in the retentate.

The above comparisons are presented in the table below:

| | retentate | | permeate | |
|---|---|---|---|---|
| | $H_2$ rec. | $H_2$ purity | CO rec. | CO purity |
| Ube unshifted syngas | 87.3% | 93.3% | 88.5% | 64.9% |
| Generon ® unshifted syngas | 91.8% | 93.7% | 90.4% | 73.5% |

| | $H_2$ rec. | $H_2$ purity | $CO_2$ rec. | $CO_2$ purity |
|---|---|---|---|---|
| Ube shifted syngas | 89.2% | 82.8% | 45.1% | 52.2% |
| Generon ® shifted syngas | 91.8% | 79.1% | 28.1% | 45.9% |

The recoveries and purities of the separated $CO_2$ from shifted syngas is substantially lower than the recoveries and purities of the separated CO from unshifted syngas.

The invention claimed is:

1. A process comprising:
   a. feeding a separator feedstream comprising syngas from natural gas to membrane separator means,
   b. separating the separator feedstream in the membrane separator means to form a first, CO-rich stream and a second, $H_2$-rich stream,
   c. feeding the first, CO-rich stream as an oxyfuel combustor feedstream to oxyfuel combustor means for forming sub-critical $CO_2$ gas turbine working fluid, and
   d. feeding the sub-critical $CO_2$ gas turbine working fluid to gas turbine means for producing power, e. wherein the sub-critical $CO_2$ gas turbine working fluid exits the gas turbine means as gas turbine exhaust which is fed to first heat recovery steam generator means for generating steam, and wherein steam from the heat recovery steam generator means is fed as first steam working fluid to first steam turbine means for generating power, f. wherein at least a first portion of exhaust from the gas turbine means is recycled as feed to the oxyfuel combustor means together with high purity oxygen and the CO-rich stream, g. wherein the second, $H_2$-rich stream is fed as an air-fuel combustor feedstream to air-fuel combustor means for forming air-fuel gas turbine working fluid, and wherein the air-fuel gas turbine working fluid is fed to air-fuel gas turbine means for producing power, and h. wherein the first, CO-rich stream is fed directly from the membrane separator means to the oxyfuel combustor means.

2. The process of claim 1, wherein the air-fuel gas turbine working fluid exits the air-fuel gas turbine means as air-fuel gas turbine exhaust which is fed to second heat recovery steam generator means for generating steam, and wherein steam from the second heat recovery steam generator means is fed as second steam working fluid to second steam turbine means for generating power.

3. The process of claim 1, wherein the CO-rich stream comprises at least 35% CO and the $H_2$-rich stream comprises at least 10% $H_2$.

4. The process of claim 3, wherein the CO-rich stream comprises at least 50% CO and the $H_2$-rich stream comprises at least 20% $H_2$.

5. The process of claim 4, wherein the CO-rich stream comprises at least 60% CO.

6. The process of claim 1, wherein the high purity oxygen is premixed with the recycled at least first portion of exhaust from the gas turbine means.

7. The process of claim 1, wherein high purity oxygen is mixed with the recycled at least first portion of exhaust from the gas turbine means in situ within the oxyfuel combustor means.

8. The process of claim 6, wherein the high purity oxygen is least 97% pure.

9. The process of claim 6, wherein the high purity oxygen is least 99% pure.

10. The process of claim 1, comprising air separator means for separating oxygen from air to produce the high purity oxygen.

11. A process comprising:

a. feeding a separator feedstream comprising syngas from natural gas to separator means, b. separating the separator feedstream in the separator means to form a first, CO-rich stream and a second, $H_2$-rich stream, c. feeding the first, CO-rich stream as an oxyfuel combustor feedstream to oxyfuel combustor means for forming sub-critical $CO_2$ gas turbine working fluid, d. feeding the sub-critical $CO_2$ gas turbine working fluid to sub-critical $CO_2$ gas turbine means, the sub-critical $CO_2$ gas turbine means having a sub-critical $CO_2$ gas turbine expansion section and a sub-critical $CO_2$ gas turbine compression section, the sub-critical $CO_2$ gas turbine working fluid being fed to the sub-critical $CO_2$ gas turbine expansion section for producing power, e. recycling at least a first portion of exhaust from the sub-critical $CO_2$ gas turbine expansion section to the sub-critical $CO_2$ gas turbine compression section of the sub-critical $CO_2$ gas turbine means, wherein the power produced in step (d) is used to power the sub-critical $CO_2$ gas turbine compression section to compress the recycled at least first portion of exhaust from the sub-critical $CO_2$ gas turbine expansion section, f. capturing the remaining portion of the exhaust from the sub-critical $CO_2$ gas turbine expansion section, g. feeding the compressed recycled at least first portion of exhaust from sub-critical $CO_2$ gas turbine expansion section to the oxyfuel combustor means, h. reacting the first, CO-rich stream with high purity oxygen in the oxyfuel combustor means under sub-critical $CO_2$ conditions, i. feeding the second, $H_2$-rich stream as an air-fuel combustor feedstream to air-fuel combustor means wherein the air-fuel combustor feedstream is reacted with air to form an air-fuel gas turbine working fluid, j. feeding the air-fuel gas turbine working fluid to air-fuel gas turbine means, the air-fuel gas turbine means having an air-fuel gas turbine expansion section and an air-fuel gas turbine compression section, the air-fuel gas turbine working fluid being fed to the air-fuel gas turbine expansion section for producing power, k. feeding air to the air-fuel gas turbine compression section of the air-fuel gas turbine means, wherein the air is compressed using the power produced in step (j), l. feeding the compressed air to the air-fuel combustor means for reaction with the second, $H_2$-rich stream to form the air-fuel gas turbine working fluid, m. wherein before recycling the at least first portion of exhaust from the sub-critical $CO_2$ gas turbine expansion section to the sub-critical $CO_2$ gas turbine compression section of the sub-critical $CO_2$ gas turbine means, the exhaust from the sub-critical $CO_2$ gas turbine expansion section is fed to first heat recovery steam generator means for generating steam, n. wherein steam from the first heat recovery steam generator means is fed to first steam turbine means for generating power, o. wherein exhaust from the air-fuel gas turbine means is fed to second heat recovery steam generator means for generating steam, p. wherein steam from the second heat recovery steam generator means is fed to second steam turbine means for generating power, and q. wherein the first, CO-rich stream is fed directly from the separator means to the oxyfuel combustor means.

* * * * *